United States Patent Office 3,629,374
Patented Dec. 21, 1971

3,629,374
LACTONE/ALKYLENE OXIDE COPOLYMERS AS PLASTICIZERS FOR VINYL CHLORIDE RESINS
Robert Dean Lundberg, Somerville, N.J., and Frank Paul Del Giudice, Charleston, and Robert Gladden Kelso, St. Albans, W. Va., assignors to Union Carbide Corporation, New York, N.Y.
No Drawing. Filed Apr. 1, 1969, Ser. No. 812,311
Int. Cl. C08f 29/24
U.S. Cl. 260—899
6 Claims

ABSTRACT OF THE DISCLOSURE

Plasticized vinyl chloride resin containing as the plasticizer therefor, a lactone/alkylene oxide copolymer.

---

This invention relates to plasticized compositions and to a process for their preparation. In one aspect, this invention is directed to plasticized vinyl resins hereinafter described which exhibit a combination of desirable characteristics at favorable commercial economics.

A major shortcoming of externally-plasticized, flexible resin compositions, e.g., poly(vinyl chloride), is the tendency of the plasticizer to escape from the plasticized composition by volatilization or by extraction processes. These tendencies become aggravated or more pronounced at elevated temperatures such as in fields of applications in which the plasticized composition is used, for example, as an insulating medium for wire and cable. Contact with various liquid media, e.g., water, oil, fats, etc., also can result in considerable extraction or loss of the plasticizer in the plasticized composition. Loss of the plasticizer eventually can cause undesirable stiffening of the plasticized composition which ultimately leads to failure by cracking, excessive stiffening, shrinkage, and the like.

Fabricators of plasticized poly(vinyl chloride) have long sought a permanent plasticizer that would be essentially non-volatile and non-extractable. Some progress in this direction has been made by using relatively high molecular weight butadiene-acrylonitrile rubbers as plasticizers, but shortcomings in color, clarity, resistance to oxidative attack, light stability, and processing characteristics have limited the use and effectiveness of these rubbers in flexible vinyl compositions. Likewise, relatively high molecular weight, viscous liquid polyesters have met with some success, but difficulties in handling these viscous polyesters, and high cost, have placed limitations on their uses.

Accordingly, one or more of the following objects will be achieved by the practice of the instant invention. It is an object of this invention to provide novel plasticized compositions which exhibit a combination of favorable properties at desirable economics and costs. Another object of this invention is to provide novel plasticized resin compositions which have the combined characteristics of low brittle temperatures, good permanence, and low volatility of the plasticizer. These and other objects will readily become apparent to those skilled in the art in the light of the teachings herein set forth.

In a broad aspect, the invention contemplates the preparation of novel plasticized polymer compositions, both the plasticizers and the polymer compositions being described in detail hereinafter. These novel plasticized polymer compositions, especially novel plasticized poly(vinyl chloride), exhibit a combination of desirable properties. The novel plasticized polymer compositions exhibit superior low temperature impact strength, and a high degree of permanence. Fine flexibility at temperatures below 0° C. and good brittle temperatures also are characteristic of the novel plasticized polymer compositions.

In addition, these novel plasticized compositions exhibit low volatility, high resistance to oil and water extraction, and excellent color and processability.

The plasticizers which are contemplated in the preparation of the novel plasticized compositions are lactone/alkylene oxide copolymers which possess a reduced viscosity value of at least about 0.03, and desirably from about 0.1 to about 5, and higher. These lactone/alkylene oxide copolymers are further characterized by the recurring structural units designated as I and II below, that is, linear Unit I of the formula:

I 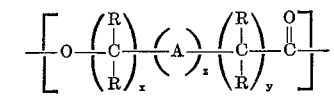

wherein each R, individually, is hydrogen, alkyl, halo, or alkoxy; wherein A is the oxy group, wherein $x$ is an integer from 1 to 4; wherein $y$ is an integer from 1 to 4; wherein $z$ is an integer of zero or one; with the provisos that (a) the sum of $x+y+z$ is at least 4 and not greater than 7, and (b) the total number of R variables which are substituents other than hydrogen does not exceed 3, preferably does not exceed 2; and linear Unit II of the formula:

II 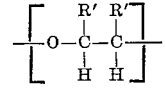

wherein each R', individually, is hydrogen, alkyl, cycloalkyl, aryl, or chloroalkyl, or in which the two R' variables together with the ethylene moiety of the oxyethylene chain of Unit II form a saturated cycloaliphatic hydrocarbon ring having from 4 to 8 carbon atoms, desirably from 5 to 6 carbon atoms.

With reference to Unit I above, illustrative R variables include methyl, ethyl, isopropyl, n-butyl, sec-butyl, t-butyl, hexyl, chloro, bromo, iodo, methoxy, ethoxy, n-butoxy, n-hexoxy, 2-ethylhexoxy, dodecoxy, and the like. It is preferred that each R, individually, be hydrogen, lower alkyl, e.g., methyl, ethyl, n-propyl, isobutyl, and/or lower alkoxy, e.g., methoxy, ethoxy, propoxy, n-butoxy, and the like. It is further preferred that the total number of carbon atoms in the R substituents does not exceed eight. With reference to Unit II above illustrative R' variables include methyl, ethyl, n-propyl, isopropyl, t-butyl, the hexyls, the dodecyls, 2-chloroethyl, phenyl, phenethyl, ethylphenyl, cyclopentyl, cyclohexyl, cycloheptyl, and the like. It is preferred that R' be hydrogen; lower alkyl, e.g., methyl, ethyl, n-propyl, isopropyl; chloroalkyl, e.g., 2-chloroethyl; and the like.

The aforedescribed recurring linear Unit I is interconnected through the oxy group (—O—) of one unit with the carbonyl group

of a second unit or with the carbon atom of the alkylene moiety of the oxyalkylene Unit II. In other words, the interconnection of these units does not involve the direct bonding of two carbonyl groups, i.e.,

or two oxy groups, i.e., —O—O—. With relation to the relatively high molecular weight lactone/alkylene oxide copolymers, the terminal moieties thereof are not determinable by infra-red analysis which factor is readily understandable since macromolecules are involved. On the other hand, the relatively low molecular weight e.g., those having reduced viscosity values below about 0.3 are characterized by end groups which can be hydroxyl; carboxyl; hydrocarbyl such as alkyl, cycloalkyl, aryl, aralkyl, and alkaryl; hydrocarbyloxy such as alkoxy, cycloalkoxy, aryloxy, aralkoxy, and alkaryloxy; and possibly other moieties such as catalyst residue; and mixtures of the foregoing. It is highly desirable, however, that the hydroxyl and carboxyl end-groups, if present, be esterified or acrylated such as by reacting the hydroxyl moiety with a monocarboxyl compound or its corresponding anhydride, e.g., acetic acid, acetic anhydride, butyric acid, 2-ethylhexanoic acid, benzoic acid, etc., or by reacting the carboxyl moiety with a monohydroxyl compound such as a monohydric alcohol or monohydric phenol, e.g., methanol, 2-ethylhexanol, isobutanol, phenol, and the like. The esterification or etherification of such end-groups result in lactone/alkylene oxide copolymers which give enhanced plasticization since the water extractability characteristic of such copolymers is markedly reduced.

Particularly preferred lactone/alkylene oxide copolymers are those which are characterized by the oxypentamethylenecarbonyl chain and the oxyethylene chain. Such preferred copolymers are characterized by recurring structural Units III and IV below:

III 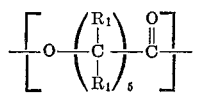

wherein each $R_1$ is hydrogen or lower alkyl, perferably hydrogen or methyl, with the proviso that no more than three $R_1$ variables are substituents other than hydrogen; and IV 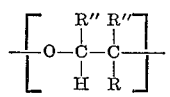

wherein each $R''$, individually, is hydrogen or lower alkyl, preferably hydrogen, methyl, and ethyl.

The lactone/alkylene oxide copolymers can be manufactured via the process described in U.S. Pat. No. 2,962,524. In this process, an admixture comprising lactone, alkylene oxide, and a polyfunctional initiator possessing amino, hydroxyl, and/or carboxyl groups, e.g., diethylene glycol, monoethanolamine, adipic acid, etc., preferably in the presence of a Lewis acid catalyst such as boron trifluoride, are reacted using a molar excess of monomeric reactants over initiator. The resulting polymeric products have hydroxyl termination which can be converted to acyloxy or hydrocarbyloxy moieties by conventional techniques. Substantially block lactone/alkylene oxide copolymers can be prepared using potassium hydroxide catalyst.

Suitable monomeric lactones which can be employed in the manufacture of the lactone/alkylene oxide copolymers are best illustrated by the following formula:

V 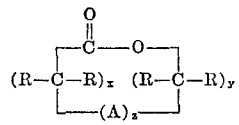

wherein the R, A, x, y, and z variables have the significance noted in Unit I supra.

Representative monomeric lactones which are contemplated include, for example, delta-valerolactone; epsilon-caprolactone; zeta-enantholactone; eta-caprylolactone; the monalkyl-delta-valerolactones; e.g., the monomethyl-, monoethyl-, monohexyl-, delta-valerolactones, and the like; the dialkyl-delta-valerolactones, e.g., the dimethyl-, diethyl-, and di-n-octyl-delta-valerolactones, and the like; the monoalkyl-dialkyl-, and tri-alkyl-epsilon-caprolactones, e.g., the monomethyl-, monoethyl-, monohexyl-, dimethyl-, diethyl-, di-n-propyl-, di-n-hexyl-, trimethyl-, triethyl-, and tri-n-propyl-epsilon-caprolactones, and the like; the monoalkoxy- and dialkoxy-delta-valerolactones and epsilon-caprolactone, e.g., the monomethoxy-, monoisopropoxy-, dimethoxy-, and diethoxy-delta-valerolactones and epsilon-caprolactones, and the like; 1,4-dioxane-2-one; and the like. A single lactone monomer or mixtures of such monomers may be employed.

The monomeric alkylene oxides which are useful in the processes for preparing the copolymeric plasticizer is illustrated in Formula VI below:

VI 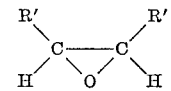

wherein each $R'$, individually, have the meanings noted in Unit II supra. Specific alkylene oxide include, by way of example, ethylene oxide, propylene oxide, the butylene oxides, styrene oxide, epichlorohydrin, cyclohexane oxide, and the like.

Lactone/alkylene oxide copolymers can also be prepared by reacting an admixture comprising lactone and alkylene oxide monomers, an interfacial agent such as a solid, relatively high molecular weight poly(vinyl stearate) or lauryl methacrylate/vinyl chloride copolymer (reduced viscosity in cyclohexanone at 30° C. of from about 0.3 to about 1.0), in the presence of an inert normally-liquid saturated aliphatic hydrocarbon vehicle such as heptane, phosphorus pentafluoride as the catalyst therefor, at an elevated temperature, e.g., about 80° C., and for a period of time sufficient to produce such lactone/alkylene oxide copolymers.

As mentioned previously, the lactone/alkylene oxide copolymers which are contemplated as plasticizers are oftentimes expressed in terms of their reduced viscosity values. As is well known in the art, reduced viscosity value is a measure or indication of the molecular weight of polymers. The expression "reduced viscosity" is a value obtained by dividing the specific viscosity by the concentration of polymer in the solution, the concentration being measured in grams of polymer per 100 milliliters of solvent. The specific viscosity is obtained by dividing the difference between the viscosity of the solution and the viscosity of the solvent by the viscosity of the solvent. Unless otherwise noted, the reduced viscosity values herein referred to are measured at a concentration of 0.2 gram of polymer in 100 milliliters of solvent (e.g., cyclohexanone, benzene, chloroform, toluene, or other common organic solvents) at 30° C.

The particularly preferred copolymers which can be employed as plasticizers are those which contain a major amount, on a weight basis, of Unit I supra, and a minor amount, on a weight basis, of Unit II supra. Desirably the plasticizer contains from about 50 to about 95 weight percent of Unit I, and from 50 to about 5 weight percent of Unit II, based on the total weight of Units I and II. Highly preferred plasticizers contain from about 60 to about 85 weight percent of Unit I having the oxypentamethylenecarbonyl structure, and from about 40 to about 15 weight percent of Unit II having the oxyethylene or oxypropylene structure.

The resins which can be satisfactorily plasticized by the lactone/alkylene oxide copolymers hereinbefore disclosed are solid plasticizable vinyl chloride homopolymers and copolymers such as poly(vinyl chloride), vinyl chloride/vinyl acetate copolymer, vinyl chloride/acrylontrile copolymer, vinyl chloride/acrylonitrile/vinylidene chloride copolymer, vinyl chloride/vinyl propionate copolymer, vinyl chloride/methacrylonitrile copolymer, vinyl chloride/vinyl methyl ketone copolymer, vinyl chloride/acrylonitrile/methacrylonitrile copolymer, and the like.

In general, any one of several methods of mixing and fluxing can be utilized in the preparation of the plasticized compositions of this invention. For instance, the plasticizable polymer and the plasticizer can be intimately dispersed by stirring or tumbling and the admixture fluxed into a continuous sheet on a steam heated roll mill. Other methods of mixing and fluxing, such as a Banbury cycle followed by calendering can also be employed.

In practice, the lactone/alkylene oxide copolymer will be employed in a plasticizing amount. By the term "plasticizing amount" is meant that quantity of copolymer which will appreciably increase the flexibility, workability or distensibility of the material with which it is admixed. The preferred concentration of copolymeric plasticizer in the plasticizable polymer is generally within the range of from about 25 to about 125 parts by weight per 100 parts by weight of plasticizable polymer, although concentrations above and below the aforesaid range can be employed. Thus, as little as one part of the lactone/alkylene oxide copolymer to 100 parts of the plasticizable polymer may have a measurable effect on the stiffness of the mixture while the upper limit would be determined by the degree of flexibility that the end use might require.

As plasticizers, the aforesaid lactone/alkylene oxide copolymers impart highly desirable properties and characteristics to plasticizable vinyl chloride polymers. The incorporation of such copolymeric plasticizers into the vinyl chloride polymers results in a plasticized composition which exhibits good low brittle temperature characteristic. The novel plasticized polymeric compositions also have the ability to resist shattering at low temperatures. In addition, the novel plasticized compositions exhibit low volatility and good resistance to oil and water extraction.

In the following illustrative examples, various lactone/alkylene oxide copolymers were evaluated as plasticizers for vinyl chloride resins. In general, the plasticized compositions were prepared by fluxing the lactone/alkylene oxide copolymer and vinyl chloride resin on a two-roll mill at temperatures of about 150°–160° C. for a few minutes. The sheets obtained by this procedure were then molded at 150°–160° C. to obtain specimens suitable for testing. In reporting the physical properties of the plasticized vinyl chloride compositions certain symbols and abbreviations are employed. These symbols and abbreviations (and various tests) are defined as follows:

(1) A.S.T.M.=American Society of Testing Materials.

(2) $T_f$ and $T_4$=Temperatures at which torsional stiffness moduli are 135,000 and 10,000 p.s.i. respectively, as determined in accordance with A.S.T.M. Method D 1043–51.

(3) $T_B$ (brittle temperature)=Low temperature impact measurement as determined in accordance with A.S.T.M. Method D 746–55T.

(4) Volatility determined in accordance with A.S.T.M. Method D 1203–55 (test temperature of 70° C.).

(5) Oil extraction (test temperature of 50° C.) determined in accordance with the formula:

$$E_1 = \frac{100(W_1 - W_2)}{W_2}$$

wherein $E_1$ is the weight percent extraction of plasticizer, wherein $W_1$ is the original weight of the plasticized sample, and wherein $W_2$ is the final weight of the plasticized sample after subjecting sample to mineral oil extraction test for a period of time, followed by drying in a circulating air oven at 70° C. for 30 minutes.

(6) Water extraction (test temperature of 70° C.) determined in accordance with the formula:

$$E_w = \frac{100(W_1 - W_2)}{W_1} \cdot \frac{t(\text{actual})}{0.004}$$

wherein $E_w$ is the weight percent extraction of plasticizer, wherein $W_1$ is the original weight of the plasticizer sample, wherein $W_2$ is the final weight of the plasticized sample after subjecting sample to water extraction test for a period of time, followed by drying in a circulating air oven at 70° C. for 30 minutes, wherein $t(\text{actual})$ is the actual thickness of the sample, and wherein 0.004 is a factor to adjust the thickness of the sample to the standard 4 mils.

(7) Durometer "A" hardness is a measure of resistance of indentation of an 0.25 inch specimen by a pin equipped with a truncated cone point as described in A.S.T.M. Method D 676–49T.

(8) QYTQ=polyvinyl chloride resin; inherent viscosity 0.95–1.0.

EXAMPLES 1–4

In these examples, the lactone/alkylene oxide copolymer plasticizer was prepared by dissolving the KOH catalyst in the hydroxyl initiator under a nitrogen atmosphere at a temperature of 100° C. in a stainless steel autoclave equipped with automatic temperature and pressure controls and a circulating pump. After heating to 110°–114° C. the lactone and alkylene oxide mixture was added at a rate to hold the reactor pressure at 50 p.s.i.g. A total time of 12 hours was required to add the lactone/alkylene oxide mixture. At the end of this period the reaction was continued until the reactor pressure drop was less than one p.s.i.g./hour.

The reaction product mixture was then neutralized with an equivalent amount of hydrochloric acid and unreacted monomers were removed under reduced pressure. The neutralized reaction product was then filtered to remove the salts therefrom.

The lactone/alkylene oxide copolymeric product from the preceding paragraph was then alylated with a 50 mole percent excess of acetic anyhdride for 3 to 4 hours at 175° C. Excess anhydride and acid by-product were then removed under reduced pressure. 70 parts by weight of the resulting acylated alkylene oxide/lactone copolymeric product and 100 parts poly(vinyl chloride) (QYTQ) were then fluxed as explained in the discussion preceding the examples. The pertinent data are set out in Table I below.

TABLE I

| Example | 1 | 2 | 3 | 4 |
|---|---|---|---|---|
| Lactone | ε-Caprolactone | ε-Caprolactone | ε-Caprolactone | ε-Caprolactone. |
| Alkylene oxide | Propylene oxide | Propylene oxide | Propylene oxide | Ethylene oxide. |
| Lactone/alkylene oxide, by weight | 70/30 | 80/20 | 70/30 | 70/30. |
| Initiator | 2-ethylhexanol | 2-ethylhexanol | Glycerine | Dipropyleneglycol. |
| Terminating group | Isobutyric | Acetic | Isobutyric | Isobutyric. |
| Molecular weight | 1,450 | 1,440 | 1,700 | 2,200. |
| Durometer, Shore A | 73 | 73 | 77 | 74. |
| $T_B$, °C | −22 | −28 | −14 | −24. |
| $T_4$, °C | −8 | −5 | −3 | −4. |
| $T_f$, °C | −26 | −23 | −23 | −30. |
| SPI volatility, percent | 1.7 | 1.9 | 0.9 | 2.3. |
| Extraction: | | | | |
| Water, percent | 2.1 | 2.6 | 1.3 | 6.00 |
| Oil (K) | 1.9 | 1.1 | 0.6 | 0.5. |

EXAMPLES 5–6

A 50 weight percent solution of lactone and alkylene oxide monomers in benzene was added to a reaction flask equipped with a reflux condenser and a stirrer. The resulting reaction mixture was cooled to −80° and 0.7 weight percent phosphorous pentafluoride (based on total monomeric feed) was added thereto. Thereafter the reaction mixture was heated to 60°–65° C. and maintained thereat for about 14 hours with stirring. At the end of this period of time the reaction product mixture was cooled to room temperature. The benzene was removed in vacuo and the lactone/alkylene oxide copolymeric product was recovered. 54 parts of the resulting copolymeric product was fluxed with 100 parts of poly(vinyl chloride) (QYTQ) as explained in the discussion preceding the examples. The pertinent data are set in Table II below.

| Example | 1 | 2 |
|---|---|---|
| Lactone | ε-Caprolactone | ε-Caprolactone |
| Alkylene oxide | Propylene oxide | Propylene oxide |
| Reduced viscosity | 0.24 | 0.21 |
| Weight ratio of lactone/alkylene oxide | 82/18 | 65/35 |
| Durometer, Shore A | 82 | 83 |
| $T_B$, °C | −19 | −19 |
| SPI volatility, percent | 1.2 | 0.8 |
| Extraction: | | |
| Water, percent | 1.1 | 1.0 |
| Oil (K) | <0.5 | 0.7 |

EXAMPLE 7

Equal parts by weight of poly(vinyl chloride) having a reduced viscosity of 0.75, and a solid epsilon-caprolactone/1,2-butylene oxide copolymer having a reduced viscosity of 0.3 and comprised of epsilon-caprolactone and 1,2-butylene oxide in a respective weight ratio of 80:20, were milled together with a conventional heat stabilizer for 5 minutes at temperatures ranging from 165° C. initially, down to 100° C. at the end of the milling. There was obtained a flexible, clear sheet. The resulting plasticized composition is characterized by low stiffness modulus at 25° C., unusually low brittle temperature ($T_B$, °C.), very slight oil and water extraction.

EXAMPLE 8

Poly(vinyl chloride), inherent viscosity of 0.95, is mechanically mixed with 45 weight percent of a solid copolymer of 70 parts by weight of mixed dimethyl-substituted-epsilon-caprolactone and 30 parts by weight of ethylene oxide (Ir=0.25). The resulting admixture of vinyl resin and plasticizer then if fluxed on a steam-heated, two-roll mill at 158° C. The resulting plasticized composition is characterized by low stiffness modulus at 25° C., low brittle temperature ($T_B$, °C.), slight oil and water extraction.

EXAMPLE 9

Poly(vinyl chloride), inherent viscosity of 0.8, is mechanically mixed with 80 weight percent of a solid copolymer of 80 parts by weight of ε-methyl-ε-caprolactone and 20 parts by weight of propylene oxide. The resulting admixture of vinyl resin and plasticizer then if fluxed on a steam-heated, two-roll mill at 158° C. The resulting plasticized composition is characterized by low stiffness modulus at 25° C., low brittle temperature ($T_B$, °C.), slight oil and water extraction.

EXAMPLE 10

A vinyl chloride-acrylonitrile copolymer consisting of 85 parts by weight of vinyl chloride and 15 parts by weight of acrylonitrile, inherent viscosity of 1.1, is mechanically mixed with 50 weight percent of a liquid copolymer of 65 parts by weight of delta-valerolactone and 35 parts by weight of 2,3-butylene oxide. The resulting admixture of vinyl resin and plasticizer then is fluxed on a steam-heated, two-roll mill at 158° C. The resulting plasticized composition is characterized by low stiffness modulus at 25° C., low brittle temperature ($T_B$, °C.), slight oil and water extraction, and low volatile loss.

What is claimed is:

1. A plasticized composition comprising a vinyl chloride resin and, as the plasticizer therefor, a plasticizing amount of a lactone/alkylene oxide copolymer which has a reduced viscosity value of at least about 0.03 measured at a concentration of 0.2 gram of copolymer in 100 milliliters of benzene at 30° C. and characterized by recurring linear structural units designated as I and II below, that is, Unit I having the formula:

I 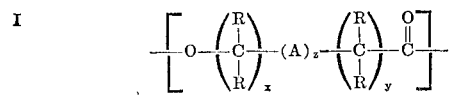

said Unit I produced by the polymerization of a monomeric lactone of the formula:

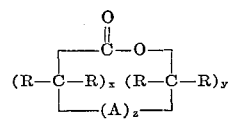

wherein each R, individually, is hydrogen, alkyl, halo, or alkoxy; wherein A is the oxy group, wherein $x$ is an integer from 1 to 4; wherein $y$ is an integer from 1 to 4; wherein $z$ is an integer of zero or one; with the provisos that (a) the sum of $x+y+z$ is at least 4 and not greater than 7, and (b) the total number of R variables which are substituents other than hydrogen does not exceed 3; and Unit II of the formula:

II 

said Unit II produced by the polymerization of a monomeric alkylene oxide of the formula:

wherein each R', individually, is hydrogen, alkyl, cycloalkyl, aryl or chloroalkyl, or in which the two R' variables together with the ethylene moiety of the oxyethylene chain of Unit II form a saturated cycloaliphatic hydrocarbon ring having from 4 to 8 carbon atoms.

2. The plasticized composition of claim 1 wherein Unit I is

III 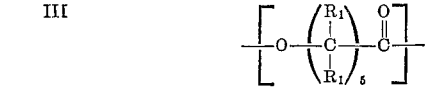

wherein each $R_1$ is hydrogen or lower alkyl, with the proviso that no more than three $R_1$ variables are substituents other than hydrogen; and wherein Unit II is VI 

wherein each R'', individually, is hydrogen or lower alkyl.

3. The plasticized composition of claim 2 wherein each $R_1$ variable of Unit III is hydrogen or methyl.

4. The plasticized composition of claim 2 wherein each $R_1$ variable of Unit III is hydrogen, and wherein each R'' variable of Unit IV is hydrogen or methyl.

5. The plasticized composition of claim 4 wherein said copolymers contain a major amount, on a weight basis, of Unit III, and a minor amount, on a weight basis, of Unit IV.

6. The plasticized composition of claim 5 wherein said copolymers contain from about 60 to about 85 weight percent of Unit III and from about 40 to about 15 weight percent of Unit IV.

References Cited

UNITED STATES PATENTS

| 2,962,524 | 11/1960 | Hostettler et al. | 260—484 |
| 3,313,753 | 4/1967 | Roberts et al. | 260—23 |

FOREIGN PATENTS

| 1,000,402 | 8/1965 | Great Britain | 260—899 |

MURRAY TILLMAN, Primary Examiner

J. SEIBERT, Assistant Examiner

U.S. Cl. X.R.

260—78.3 R, 898